Dec. 3, 1935.  C. F. HAUNZ  2,023,170
STORAGE BATTERY PLATE
Filed Feb. 7, 1933   2 Sheets-Sheet 1
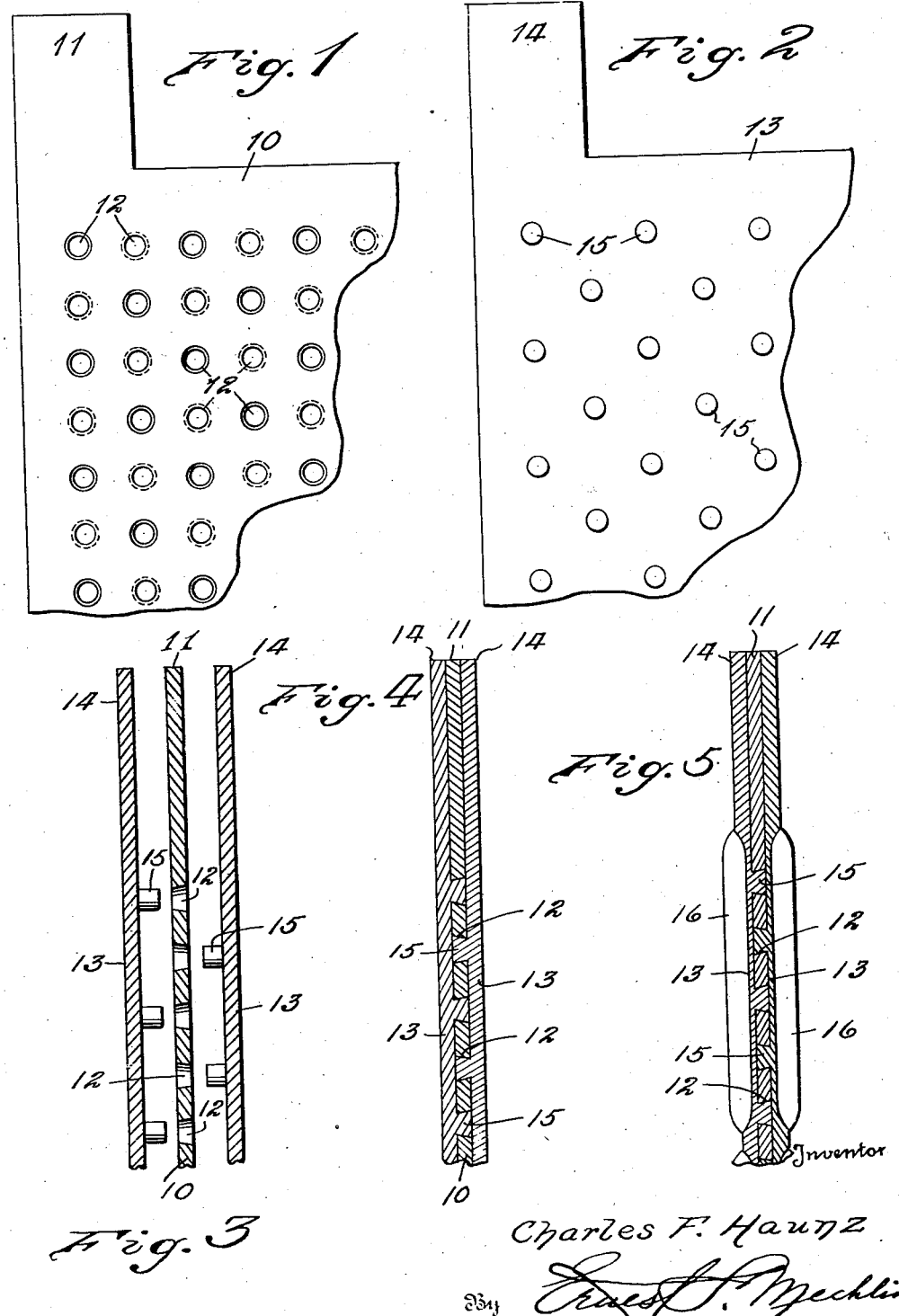

Dec. 3, 1935. C. F. HAUNZ 2,023,170
STORAGE BATTERY PLATE
Filed Feb. 7, 1933 2 Sheets-Sheet 2
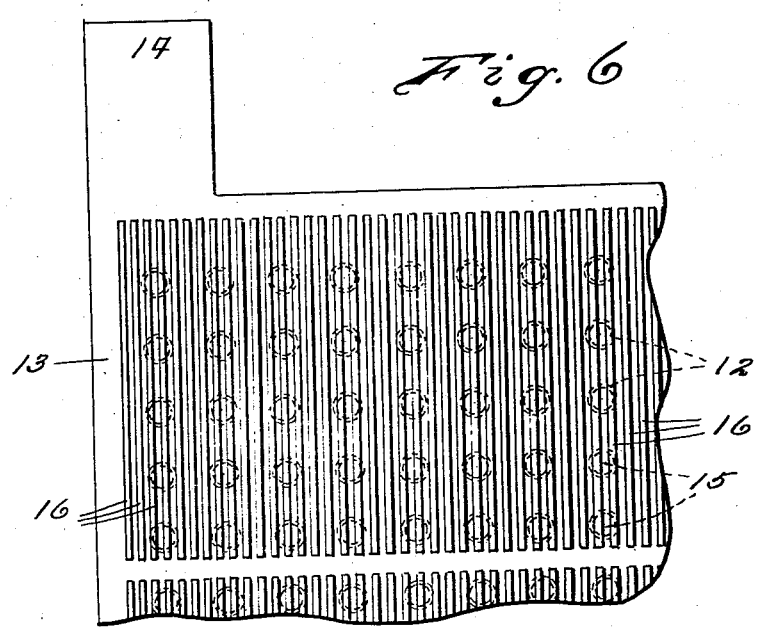
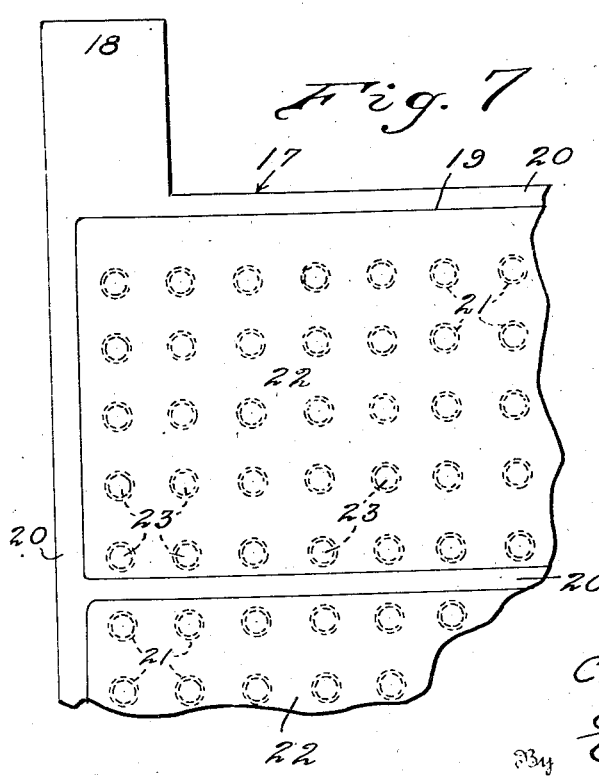
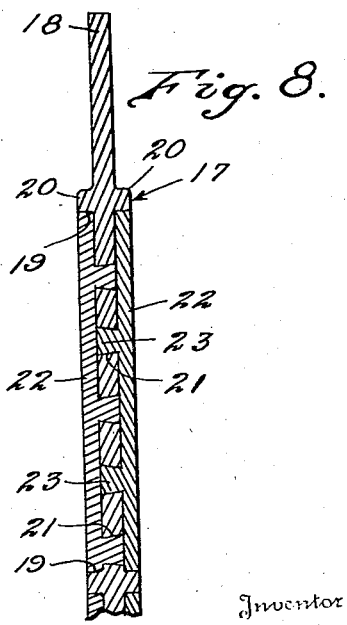
Inventor
Charles F. Haunz Patented Dec. 3, 1935

2,023,170

UNITED STATES PATENT OFFICE 2,023,170

STORAGE BATTERY PLATE

Charles F. Haunz, Buffalo, N. Y., assignor of one-third to Alexander McGary and one-third to George R. Berger, New York, N. Y.

Application February 7, 1933, Serial No. 655,665

14 Claims. (Cl. 136—70)

The invention relates to storage batteries and has special reference to those of the heavy duty type such for instance as are used in submarines, railroad car lighting systems, air conditioning apparatus and the like, there being, however, no limitation as to the place or character of the equipment where the battery is used.

The principal object of the invention, generally stated, is to provide a novel positive plate of the Planté type which will be comparatively light in weight and yet which will possess great strength and particularly rigidity so as not to buckle in service with resultant damage to or possible cutting through whatever separators are used, the latter mentioned contingency which arises in connection with ordinary plates naturally causing short circuiting of the plates and destruction of the battery.

An important object of the invention is to provide a positive plate of the Planté type which may be made in very large sizes so as to have high capacity appropriate for service in heavy duty installations and which on account of its mechanical construction will retain its plane or flat form or in other words be free from buckling even under the most adverse circumstances or conditions of use regardless of whether such be expected and more or less anticipated or whether they be more or less in the nature of emergency or accidental contingencies.

A more specific object of the invention is to provide a battery plate which may be broadly described as of laminated construction, all the laminae cooperating with one another mechanically to serve as or constitute mutual bracing and reinforcing means which will insure stiffness or rigidity and freedom from buckling.

A still more specific object of the invention is to provide a storage battery plate of the Planté type embodying a foundation or core of an appropriate lead alloy and active layers or laminae of pure lead mechanically secured thereto and grooved, spun, pressed, stamped, cut or otherwise suitably worked to produce the necessary relatively large area accessible to the electrolyte.

Another object of the invention is to provide a positive storage battery plate of the Planté type which in an alternative form may embody a supporting foundation of appropriate alloy provided at its sides with groups of plate sections of pure lead mechanically secured thereto, this variation distinguishing from the first mentioned in that the foundation or core is not entirely enclosed but is more or less in the nature of a frame for holding the active plate sections.

A still further object of the invention is to provide a positive storage battery plate of the Planté type characterized by its laminal construction and in which the exposed sections are so securely fastened to or substantially united with the foundation or core as to avoid any possibility of loosening during whatever steps may be resorted to for defining the necessary ribs, fins or other multiplicity of active surfaces or surfaces which will become active when the plate is "formed" in accordance with known methods.

The invention further contemplates a novel method and means for securing the different sections or laminae together so that the much desired rigidity will be insured.

To the attainment of the foregoing and other objects and advantages the invention preferably consists in the mechanical construction and method of assembly to be hereinafter more fully described and claimed, and illustrated in the accompanying drawings in which:

Figure 1 is a fragmentary elevation of the core or foundation of a plate constructed in accordance with the invention, Figure 2 is a fragmentary inside face view of one of the outer sections or laminae, Figure 3 is a detail vertical sectional view through a portion of the core and outer laminae showing the same separated, Figure 4 is a similar view showing these parts secured together or united, Figure 5 is a similar view with the outer laminae scored, grooved or otherwise formed to define fins or ribs, Figure 6 is a fragmentary elevation of the finished plate, Figure 7 is an elevation showing a modification embodying groups of outer sections, Figure 8 is a cross section therethrough.

Referring more particularly to the drawings and especially Figures 1 to 6, the plate is represented as comprising a foundation or core 10 preferably of an alloy of lead and antimony. This core may be formed as a casting or stamping and has the usual terminal lug 11. Throughout the major portion of its area this foundation member is formed with holes 12 spaced convenient distances apart and preferably though not necessarily arranged symmetrically. Regardless of the exact mode of construction or formation of the core as well as the holes therein, it is intended that the latter be tapered with the larger ends of some, preferably alternate ones, at one side and the larger ends of the others at the opposite side as very clearly illustrated particularly in Figure 3. This can all very conveniently be done by a casting method.

Disposed against the sides of this core or foundation member are correspondingly shaped plates 13 formed of pure or at least substantially pure lead as is necessary in storage battery construction. When it is said that the lead is "pure" it is merely meant that it must be free from any substances which might be deleterious. As these plates are preferably coextensive, in this form of the invention, with the foundation or central core they are likewise formed with lugs 14 which overlie the above described lugs 11. Each side plate 13 is formed with a series of projections 15 of a size and shape to be received within the openings 12 for the purpose of serving as retaining means. The projections on one plate 13 are staggered with respect to those on the other, the intention and arrangement being that the projections on each plate may be introduced through the smaller ends of the holes 12. The alternating arrangement of the oppositely tapered holes carries out this idea in a very simple manner as shown in Figure 3. It might be mentioned at this point that it is probably immaterial whether the projections be formed by casting, stamping or any other method. As assembly of the component parts contemplates upsetting the projections so that they will completely fill the holes 12, it is probably advisable, even if not absolutely necessary, to make the projections 15 at least slightly longer than the thickness of the central core or foundation member so as to provide additional metal for filling the larger ends of the holes.

The members 10 and 13 having been prepared, are placed together with the former between the latter and the assembly is then subjected to suitable pressure so as to bring the elements into close contacting relation and to mash over the ends of the projections into the larger portions of the holes as indicated in Figure 4. The projections will then assume a shape which is dovetailed in longitudinal section and the result will be that the outer or lead plates will be held inseparably against the core or foundation so as to define a unit which will be mechanically strong and which will also on account of its laminated structure be proof against buckling tendencies.

The next step in the construction involves the provision of a large area accessible to the electrolyte. To effect this the outer plates or layers 13 are pressed, cut, grooved, rolled, spun or otherwise treated to form ribs or fins 16 which may be continuous in length or which may be arranged in groups or panels as represented in Figures 5 and 6. It is conceivable that these fins or ribs, or their equivalent, may be produced at the same time the plates 13 are pressed against the central core or foundation, but there is no limitation in this respect as the ribs may be defined after the elements are assembled as above described. Moreover the interlocking of the projections 15 within the holes 12 will provide such a strong connection that the assembly may be treated very rigorously in the formation of the fins without any danger whatsoever of loosening or separation of the parts. The final step in the preparation of the plate is of course the electro-chemical one of "forming" it so as to render it active but this need not be gone into as the present invention is not concerned with subsequent treatment but only with the mechanical construction and method of production.

It is of course not necessary that the outer plates be coextensive with the core or foundation and in Figures 7 and 8 there is illustrated a modification in which the core or foundation member 17, corresponding to the member 10 and similarly formed with a terminal lug 18, is cast or otherwise formed with depressions 19 defined by marginal ribs 20. The depressed portions are formed with holes 21 exactly similar to the above described holes 12. The depressions are on both sides of the core or foundation member and located therein are panels or plate sections 22 having their confronting sides formed with projections 23 arranged in staggered relation in exactly the same manner as described in connection with the first form of the invention. Assembly of the parts is effected by properly positioning the panels within the depressions and then applying pressure to bring about upsetting or mashing over of the projections so that they will completely fill the oppositely tapered alternately arranged holes 21. The assembly is then appropriately treated in the same manner as above described to provide or form the fins or other equivalent means for defining a large area accessible to the electrolyte.

From the foregoing description and a study of the drawings it will be apparent that there has been thus provided a very simply constructed and consequently inexpensive positive plate of the Planté type which will be light in weight, rugged in construction, and which will additionally possess the important characteristic of stiffness and mechanical resistance to any buckling tendencies even under the most adverse conditions of use. A battery embodying plates constructed in accordance with this invention should have a much longer life than one employing plates of ordinary type in that freedom from buckling will avoid damage to and possible cutting through whatever separators are interposed between successive plates. It is thought from the above that the construction, mode of assembly and advantages will be readily apparent to one skilled in the art without further explanation.

While there have been shown and described preferred embodiments of the invention, it should be understood that the right is reserved to make numerous variations and modifications in so far as the details are concerned provided such variations constitute no departure from the salient features of the invention and the underlying principles as defined by the claims.

Having thus described the invention, what is claimed is:

1. A storage battery plate comprising a lead foundation member, lead plates disposed on opposite sides thereof and spaced apart thereby, and means integral with the plates for securing the lead plates to the foundation member, the means on each plate terminating at the confronting face of the other.

2. A storage battery plate comprising a foundation member formed of an alloy of lead and antimony, lead plates disposed on opposite sides of said foundation member and spaced apart thereby, and means integral with the plates for securing the lead plates to the foundation member, the means on each plate having no connection with the other plate.

3. A storage battery plate comprising an antimony-lead foundation member, lead plates disposed against opposite sides thereof, and means carried by and integral with said lead plates and passing through said foundation member for securing the parts together, the means on one plate being staggered with respect to the means on the opposed plate.

4. A storage battery plate comprising a foundation member of antimonious lead, substantially pure lead plates disposed against opposite sides thereof, and means integral with said lead plates engaged within said foundation member only for securing the parts together.

5. A storage battery plate comprising an antimonious lead foundation member, substantially pure lead plates disposed against opposite sides thereof, said foundation member having openings therein, and projections on said plates upset within said openings for retaining the parts in assembled relation.

6. A storage battery plate comprising an antimonious lead foundation member formed with holes, substantially pure lead plates disposed against opposite sides thereof, and projections formed integrally upon the plates and upset within said holes to unit the plates and the foundation member.

7. A storage battery plate comprising an antimonious lead foundation member formed with series of holes, the holes of one series being of greater size at one side of the foundation member and the holes of the other series being of greater size at the other side of the foundation member, substantially pure lead plates disposed against opposite sides of the foundation member, and a series of projections on each of the plates extending and upset within the respective series of holes for securing the plates and foundation member together.

8. A storage battery plate comprising an antimony lead alloy foundation member formed with series of oppositely tapered holes therethrough, substantially pure lead plates disposed against opposite sides of the foundation member, and a series of projections on each of said plates extending and upset within the respective series of holes for uniting the plates to the foundation member.

9. A storage battery plate comprising an antimony lead alloy foundation member formed with series of oppositely tapered holes, imperforate substantially pure lead plates disposed against opposite sides of the foundation member and each formed with a series of projections, said plates lying flat against and in close contact with said foundation member, and said projections being received and upset within said holes for securing the plates and the foundation member firmly together.

10. A storage battery plate comprising an antimonious lead core, imperforate substantially pure lead plates disposed against opposite sides of said core, means integral with the plates upset within the core for securing the parts together, said plates having expanded surfaces.

11. A storage battery plate comprising a foundation frame of antimonious lead having its opposite sides formed with depressed portions, imperforate plates of substantially pure lead fitting within said depressed portions, means integral with the plates entering within the core for securing the plates thereto, said plates having their exposed surfaces expanded.

12. A storage battery plate comprising an antimony lead core having depressed portions surrounded by marginal ribs, the depressed portions being formed with series of oppositely tapered holes, substantially pure lead plates fitting within the depressed portions and having projections upset within said holes, the exposed surfaces of the plates being expanded.

13. A storage battery plate comprising an antimonious lead foundation member formed in opposite sides with depressed portions, lead plates fitting within and filling said depressed portions, and projections on each plate extending and upset within holes in the walls of the depressed portions.

14. A storage battery plate comprising an antimonious lead foundation member formed in opposite sides with depressed portions, lead plates fitting within and filling said depressed portions, and projections on each plate extending and upset within holes in the walls of the depressed portions, the projections on opposite plates being staggered.

CHARLES F. HAUNZ.